Sept. 3, 1968  C. G. McALISTER  3,400,164
SELECTIVE HYDROGENATION OF CYCLODODECATRIENE TO CYCLODODECENE
Filed July 5, 1966  8 Sheets-Sheet 1

INVENTOR
CHARLES G. McALISTER
BY Beall and Jones
ATTORNEYS

Sept. 3, 1968          C. G. McALISTER          3,400,164
SELECTIVE HYDROGENATION OF CYCLODODECATRIENE TO CYCLODODECENE
Filed July 5, 1966                                  8 Sheets-Sheet 6

FIG.9

INVENTOR
CHARLES G. McALISTER

Sept. 3, 1968   C. G. McALISTER   3,400,164
SELECTIVE HYDROGENATION OF CYCLODODECATRIENE TO CYCLODODECENE
Filed July 5, 1966   8 Sheets-Sheet 7

FIG. 10

INVENTOR
CHARLES G. McALISTER

Sept. 3, 1968　　　　C. G. McALISTER　　　　3,400,164
SELECTIVE HYDROGENATION OF CYCLODODECATRIENE TO CYCLODODECENE
Filed July 5, 1966　　　　　　　　　　　　　　　　8 Sheets-Sheet 8

FIG.11

INVENTOR
CHARLES G. McALISTER

United States Patent Office 3,400,164
Patented Sept. 3, 1968

3,400,164
SELECTIVE HYDROGENATION OF CYCLO-
DODECATRIENE TO CYCLODODECENE
Charles G. McAlister, Lake Charles, La., assignor to Co-
lumbian Carbon Company, New York, N.Y., a corpora-
tion of Delaware
Filed July 5, 1966, Ser. No. 562,780
7 Claims. (Cl. 260—666)

ABSTRACT OF THE DISCLOSURE

In the selective hydrogenation of cyclododecatrienes and substituted cyclododecatrienes to the corresponding cyclomonoolefin, many problems arise which are not encountered in hydrogenating other unsaturated or cyclic compounds. As many as 43 different isomers, derivatives, and degradation products may appear during the selective hydrogenation of cyclododecatriene-1,5,9. The many dependent variables and problems such as hydrogen pressure, amount of hydrogen consumed, variations in hydrogen pressure, catalyst concentration and identity, and side reactions such as isomerization and ring collapse, create difficulties which have not been solved by the prior art. The present process involves critical conditions and procedures, including maintaining the hydrogen pressure at between about 30 p.s.i.g. and about 100 p.s.i.g. until from about 50% to about 90% of the stochiometric amount of hydrogen to obtain the monoolefin is reacted, then continuing the hydrogenation at a lower pressure. The temperature is also critical. A new isomer, cis,cis,cis-cyclododecatriene-1,5,9 is disclosed.

SPECIFICATION

This invention relates to the selective hydrogenation of less than the full number of carbon-to-carbon double bonds of carbocyclic compounds containing twelve carbon atoms and three double bonds in the ring. Substituents attached to the ring or nucleus are selected from the group consisting of the hydrogen radical, halide radicals, and lower alkyl radicals. Among the end products derived from such compounds, an example being cyclododecatriene, are cyclododecene, as well as the wholly saturated compounds such as cyclododecane.

During selective hydrogenation of cyclododecatrienes, it has been found that side reactions such as isomerization and/or degradation of starting materials, intermediates and/or desired products may occur by ring collapse, splitting and other means; and problems are encountered which are unique to this class of cycloolefinic compounds. As many as 48 peaks have appeared on gas chromatograms made during the course of hydrogenating cyclododecatriene, indicating this many compounds or isomers. For example, products may be formed which are difficult to separate by distillation or other procedures from the end product. Of course, side reactions also reduce the quantity of desired product.

There are few catalysts which are sufficiently selective, i.e., which will catalyze reduction of one double bond in the cycloolefinic molecule while not affecting another double bond in the molecule. Even within a particular group of catalysts which are known to be somewhat selective, such as palladium metal on carbon, differences within such classes of catalysts have been found to exist, some catalysts being less selective than others even though it would appear that they should be identical.

As mentioned above, in connection with the hydrogenation of compounds having twelve carbon atoms in the nucleus, various side eractions including ring collapse may occur. For example, in the case of 1,5,9-cyclododecatriene, aromatic by-products such as benzocyclooctene and benzocyclooctane may result from ring collapse. Evidence has been obtained that the compounds most susceptible to dehydrogenation, hydrogen transfer, and ring collapse are those having a cyclododecadiene nucleus, and that the side reaction is induced by hydrogenation catalysts. Since the reduction is preferably to a large extent stepwise, that is, a single double bond at a time is saturated, there is a high concentration of cyclododecadiene present during a portion of the hydrogenation reaction. Where the theoretically optimum conditions, from the standpoint of reaction rate, for example of high temperatures and high catalyst concentrations, are utilized, particularly at low hydrogen presures (on the theory that this would avoid early overhydrogenation to fully saturated cyclododecane), it has been found that ring collapse and consequent formation of said aromatic compounds becomes a serious problem. Not only is there a decrease in yield of the desired cyclomonoolefin by reason of the undesirable by-product, but the hydrogen transfer causes an unknown amount of hydrogen to become available, which compounds the difficulties. For example, it makes accurate determination of hydrogen requirements a complex problem. A change in one variable commonly has been found to require a change in other, interdependent variables, from what might otherwise be considered the "optimum" value for the other variable or variables. When it is realized that the variables of raw material purity, extent of hydrogenation, side reactions including isomerization and ring collapse, temperature, catalyst concentration and identity, hydrogen pressure and so on are for the most part closely and intricately related dependent variables, as contrasted with independent variables, the magnitude of the problems involved becomes apparent. Certain problems in selectively hydrogenating other cycloolefins, such as cyclooctadiene, have been encountered for those other materials, but the solutions to those problems are not helpful in solving the unique and complex problems associated with the cyclododecatrienes.

It has been found that high temperature, high catalyst concentrations, low hydrogen pressures or concentration, and/or inadequate agitation, may lead to or contribute to the side reaction involving ring collapse. Where hydrogen pressure is too high or too low, a larger proportion of the starting material is converted early in the reaction to fully saturated compounds such as cyclododecane. Additional problems which may occur in connection with the hydrogenation of cyclododecatriene are illustrated by periodic samplings taken during the course of hydrogenation of 1,5,9-cyclododecatriene to cyclododecene. The starting material was about 98% pure. The periodic samples were analyzed by gas chromatography using conventional analytical techniques, and it was found that during the entire course of the reaction a total of 48 peaks appeared on the chromatogram, thus indicating this many raw materials and impurities, cis- and trans-isomers, intermediate compounds, by-products, and final products. While many of the peaks present early in the reaction or appearing during the reaction disappeared near the end of the reaction practiced according to the present invention, thus indicating hydrogenation or isomerization to different products, this illustrates the many problems which may be involved in connection with the hydrogenation of a compound having a cyclopolyolefinic nucleus containing 12 carbon atoms.

In purifying the product it has been found difficult to separate cyclododecane, cyclododecatrienes, cyclododecadienes and cyclododecene. For example, crystallization does not readily separate cyclododecane and t,t,t-cyclododecatriene.

One improvement according to the present invention is to apply a higher hydrogen pressure during a first part of the reaction than is applied during a later or second portion of the reaction.

Another aspect of the invention involves the discovery that, by controlling the temperature of reaction, within certain limits, isomerization, ring collapse, and similar difficulties are minimized or avoided.

Another feature of the invention is the discovery that at lower catalyst concentrations, higher temperatures may be used while avoiding the foregoing problems to a substantial extent, and conversely, that at high catalyst concentrations, lower temperatures will avoid difficulties noted above.

A particularly important aspect of the invention is in recognizing and delineating the critical interrelationship of the many dependent variables involved. It is to be understood that although maximum benefits accrue in using, in addition to the novel feature of pressure reduction, continuously or stepwise, as described herein, other conditions at their optimum values, the benefits of pressure staging are substantial under all of the useful procedures and conditions described.

It is to be understood that the foregoing improvements may be used singly and in combination and in some cases an improvement useful for preparing the monoolefinic cyclic compound is also useful for the preparation of the fully saturated ring compound. Generally, it is preferred that the reaction be conducted in the liquid phase, and at elevated temperature and pressure, and in the presence of a hydrogenation catalyst, preferably a finely divided metallic palladium deposited upon a carbon substrate, also finely divided.

The foregoing and other features of the invention will be more readily understood by reference to the following detailed description.

Cyclododecatrienes suitable for use in the present invention include 1,5,9-cyclododecatriene, including the cis,trans.trans-isomer, the trans,trans,trans-isomer thereof, the cis,cis,trans-isomer thereof, the cis,cis,cis-isomer (newly isolated and identified), and the lower alkyl-substituted and halo-substituted analogs thereof. Various intermediates and final products are obtained during the course of a given hydrogenation reaction. For example, starting with a mixture of the c,t,t-isomer, the t,t,t-isomer, and the c,c,t-isomer, of 1,5,9-cyclododecatriene, intermediates include c,t-cyclododecadiene and t,t-cyclododecadiene. Where the desired end product contains a single double bond in the carbocyclic nucleus, this may be the cis-isomer, the trans-isomer and mixtures thereof.

The cyclododecatrienes are prepared by known procedures from conjugated open chain diolefinic compounds including 2-methyl-1,3-butadiene (isoprene); 1,3-pentadiene (piperylene); 2-chloro-1,3-butadiene (chloroprene); 1,3-butadiene and others. Accordingly, trimethyl-1,5,9-cyclododecatriene, and analogs thereof are useful in the practice of the invention.

The products, having a cyclododecenyl nucleus, such as cyclododecene are useful as intermediates in that they may be ozonized and oxidized to yield the corresponding dicarboxylic acids, for example, which may in turn be used to prepare amides, esters, and other compounds, all by known processes.

The hydrogen is preferably at least about 95% pure, and is treated, if necessary, to remove diluents and catalyst poisons. Hydroformer and platformer hydrogen if used are also treated to remove carbon dioxide, carbon monoxide, sulfides if present, alkanes and alkenes, as by the use of molecular sieve adsorbents. Where less pure hydrogen is utilized, it will be understood that the partial pressure of the hydrogen is taken into account when hydrogen pressure is used as a measure of the concentration of hydrogen.

The catalysts are metallic palladium or its reduceable compounds on finely divided activated carbon, preferably charcoal derived from lignocellulosic material such as coconut shells, but suitably carbon black. Suitably the catalyst contains 1% to 6% palladium by weight, with those containing 4% to 5% palladium having been found to be particularly effective. Where the carbon is in the form of charcoal, it normally contains a small proportion of silica (e.g., 2–7%), small amounts of sodium (e.g., about 200–6000 parts per million) and traces of other elements including magnesium, lead, iron, aluminum, tin, copper, silver and titanium. One highly successful and preferred catalyst is based on charcoal, with metallic palladium deposited thereon, a major proportion of the palladium being such that it does not diffract X-ray radiation and the particle size of the carbon particles being substantially entirely less than 100 microns in size as determined by micromesh screen analysis. One of these preferred catalysts has, for instance, a surface area of about 1000 m.$^2$/g. and a pore volume of about 60–65 cm.$^3$/g., relative to nitrogen. Other similar preferred catalysts had a surface area of the carbon substrate or carrier in the range of about 600 to about 1200 m.$^2$/g. The examples herein relate to the use of the above-described preferred catalyst unless otherwise specified. While metallic palladium is preferred, other metallic hydrogenation catalysts such as platinum, ruthenium, rhodium, cobalt, nickel and others are useful, but they have been found to be less selective in hydrogenating cyclotriolefinic compounds having twelve carbon atoms in the ring.

The present disclosure is largely concerned with the hydrogenation of cyclododecatriene, but it will be understood that the same applies to the other cycloolefins included in the invention, substituted or unsubstituted, which contain twelve carbon atoms and three double bonds in the ring.

Unless otherwise stated, 1,5,9-cyclododecatriene, the starting material specified in the following examples, was substantially 96.0 to 99.9% pure, substantially all the impurities being materials having a higher boiling point than the cyclododecatriene.

In the following discussion and examples, and in the drawings, abbreviations used have the following meanings:

| | |
|---|---|
| G.C. | Gas chromatography. |
| M.S. | Mass spectrometry. |
| CDA | Cyclododecane. |
| CDE | Cyclododecenes (cis- and trans-). |
| CDD | Cyclododecadienes (cis-trans and trans-trans-). |
| CDT | Cyclododecatrienes (c,t,t-, c,c,c-, t,t,t-, etc.). |
| Aromatic I | Benzocyclooctane. |
| Aromatic II | Benzocyclooctene. |
| P.s.i.g. | Pounds per square inch, gauge. |

Broadly, operable ranges of variables, utilizing a catalyst of 5% by weight of palladium on carbon, are approximately as follows:

| | |
|---|---|
| Temperature ° C | 120 to 220 |
| Hydrogen pressures atmospheres | 1 to 10 |
| Catalyst (g.)/kg. CDT | 1 to 100 |

An arbitrary choice of conditions within these ranges does not necessarily give a useful process, however, in view of the critical interrelationship of the dependent variables and the unique problems encountered. Applying the discoveries of the present invention, the preferred conditions of hydrogen pressure are as follows.

Hydrogen pressure:
    30 to 100 p.s.i.g. during a first stage of 50% to 90% conversion to CDE.
    0 to 30 p.s.i.g. during a last stage of 50% to 100% conversion to CDE.

Using these conditions of hydrogen pressure, the following preferred conditions give further improvements.

Catalyst concentration (5% Pd-C):
    0.1% to 5% correlated inversely with temperature.

In the pressure staging, there are at least two stages, three or more stages also having been found to be useful. For example, in work upon which some of the graphs (FIGS. 1–8) were based, with the exception of reactions conducted at a constant pressure, the hydrogen pressure was maintained at 30 p.s.i.g. until about 78% of the hydrogen theoretically necessary to obtain cyclododecene was reacted, the pressure was then reduced to 10 p.s.i.g. and held there until about 92% of the total hydrogen was absorbed, and for the final portion of the reaction, the hydrogen pressure was 5 p.s.i.g..

The graphs appearing in FIGS. 1–8 illustrate the complex interplay of the many dependent variables involved.

In the drawings, FIGS. 2–9 show some of the problems encountered and the complexities involved in changing one of the dependent variables and the effect thereof upon other dependent variables.

The importance of the aspect of the invention relating to utilizing a higher pressure in a first portion of the reaction than is used in a later portion of the reaction, and of the discoveries relating to the critical and variable interaction of the dependent variables, will become apparent upon considering the graphs and figures in connection with the following discussion. Before describing the individual figures of the drawings, a brief explanation of the problems encountered and discoveries made according to the present invention may be helpful. To simplify the explanation, at a fixed catalyst concentration (which is in fact a dependent variable) the mutual effects of changing pressure within the general range of 0 p.s.i.g. to 100 p.s.i.g. and temperature in the range of 120° C. to 250° C. are complex and unpredictable. Thus, at between about 140° C. and 165° C. at a fixed catalyst concentration of 0.5 to 5% (5% Pd on carbon) and fixed hydrogen pressures of between about 20 p.s.i.g. and about 50 p.s.i.g., it has been discovered that cyclododecene is favored, as against undesirable products. Contrary to what might be expected, under these conditions and at temperatures below about 140° C. the ratio of cyclododecane to cyclododecene increases somewhat. At temperatures much above about 175° C. under these conditions, e.g., 200° C. or 250° C., ring collapse and the formation of aromatics as well as increased losses to cyclododecane result. It has also been found that, as to temperature variations at this catalyst concentration, at below about 160° C. (but above about 140° C.) lower hydrogen pressures in the neighborhood of about 10 to 15 p.s.i.g. are beneficial for producing high yields of cyclododecene, and at temperatures greater than 160° C. (but below about 175° C.) higher pressures between about 15 p.s.i.g. and 50 p.s.i.g. favor cyclododecene.

Approached from another angle of varying catalyst concentrations and temperature while utilizing consistent pressure conditions, with the staging in pressures to lower pressures at a later portion of the reaction, it has been found that by reducing catalyst concentration to between about 0.1% and 0.5%, the preferred upper limit of temperature for increased yields of cyclododecene is increased to about 185° C.

At temperatures much above about 170° C. and with the catalyst concentration in the range of 0.5–5%, there is an increase in aromatic products and the fully saturated cyclododecane, the same holding true at a catalyst concentration of about 0.1–0.5% at temperatures above about 185° C.

The hydrogenation rate has been found to vary but little, if any, in the temperature range of about 140° to about 185° C. over the range of catalyst concentration of about 0.1 to 2.0%. The exception is in the event conditions are such as to favor the formation of aromatic compounds, the consequent release of hydrogen by ring collapse serving to increase the rate of hydrogenation.

To put some of the foregoing conclusions in perspective in relation to the conditions which favor aromatic compound formation, high catalyst concentrations or high temperatures result in increased production of the undesirable aromatic byproduct. Accordingly, if the conditions are so controlled to keep the production of aromatic byproducts at a low level, the rate of hydrogenation is not greatly changed as a result of the variations in temperature and catalyst concentrations.

Figure 1:
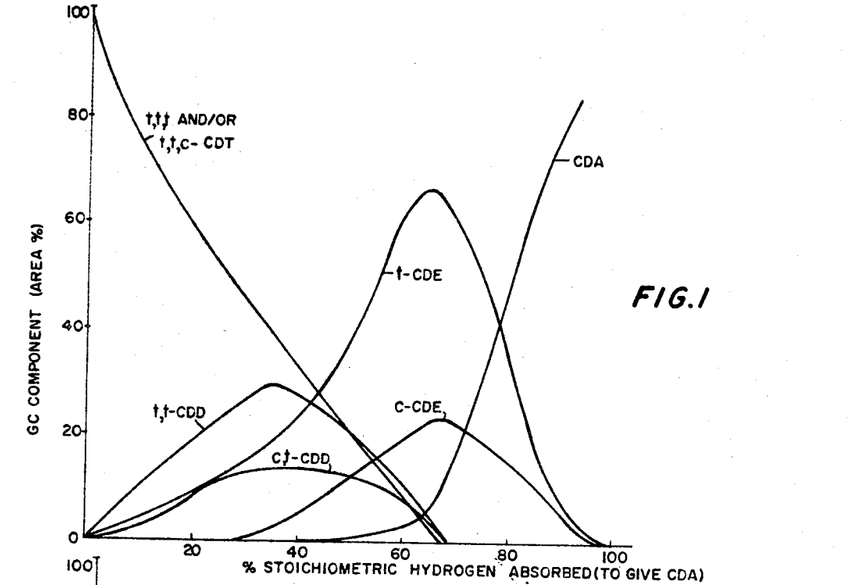
FIG. 1 shows the major intermediates and products occuring during the course of hydrogenation of cyclododecatriene.

FIG. 1 illustrates some of the products that are obtained during the hydrogenation of cyclododecatriene (primarily the trans,trans,trans-isomer and/or the trans, trans,cis-isomer) to cyclododecene and cyclododecane. These include trans,trans-cyclododecadiene trans,cis-cyclododecadiene trans-cyclododecene, and cis-cyclododecene as well as cyclododecane. In the event the desired end product is cyclododecene, the reaction is terminated at a point of hydrogen adsorption corresponding to approximately 66⅔ percent of that necessary to obtain cyclododecane. Stated another way the amount of hydrogen introduced is about 100 percent of that theoretically necessary to obtain cyclododecene.

Figure 2:
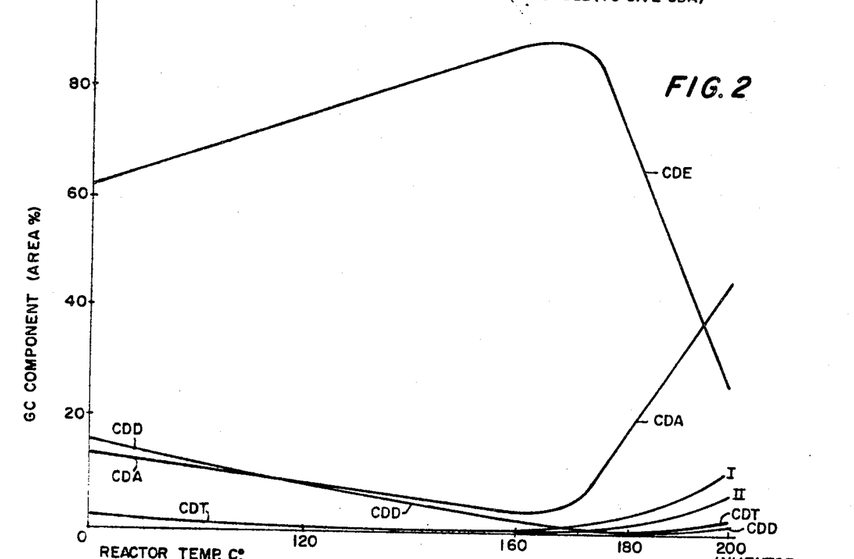

FIG. 2 was prepared from points plotted at completion of a reaction utilizing the amount of hydrogen theoretically required to obtain cyclododecene, at a fixed catalyst concentration of 1.4% based on the weight of the cyclododecatriene and containing 5% palladium on carbon with every variable fixed other than temperature. At this catalyst level and under pressure staging conditions wherein the final portion of the reaction was conducted at 5 p.s.i.g. and an earlier portion of the reaction was conducted at a higher pressure, the preferred temperature conditions are from about 140° to about 170° C.

Figure 3:
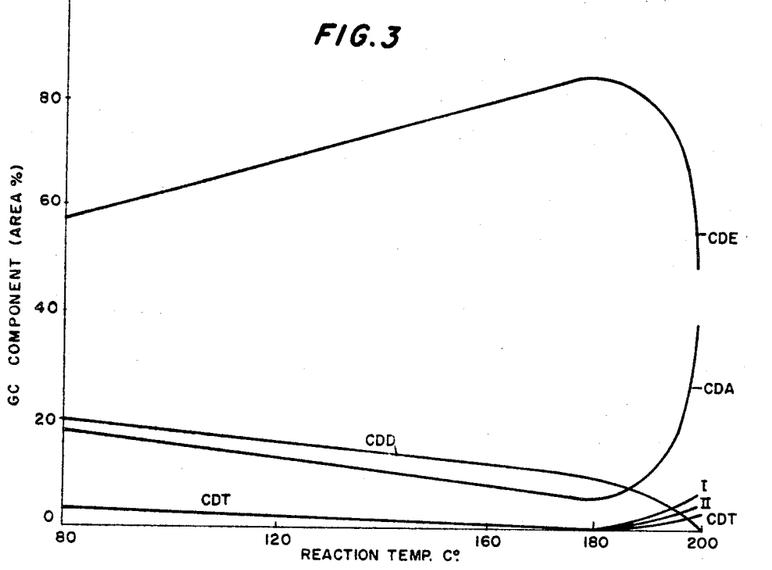

FIG. 3 illustrates that at 0.2% of the same catalyst as utilized in the reaction resulting in FIGURE 2 the interrelationship and dependency of the variables of catalyst concentration and temperature changes so that higher temperatures are useful.

Figure 4:
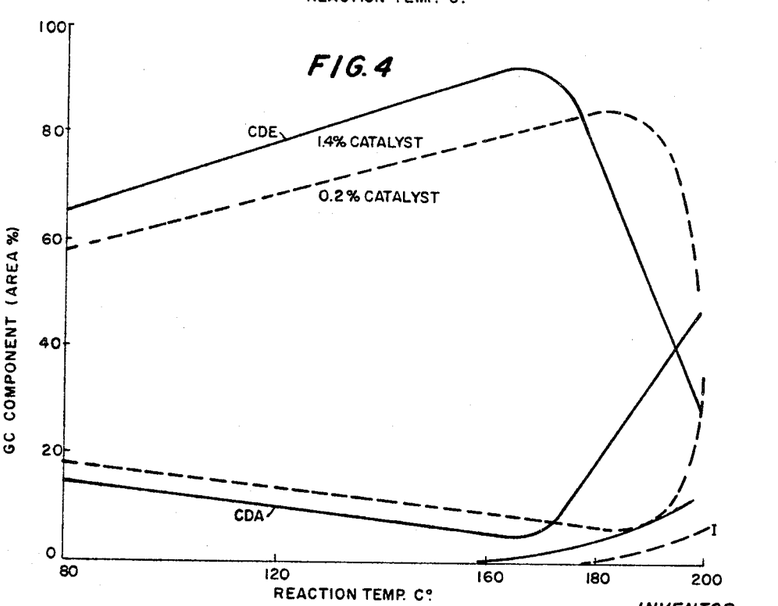

FIG. 4 includes part of the data illustrated in FIGS. 2 and 3 and permit ready comparison.

Figure 5:
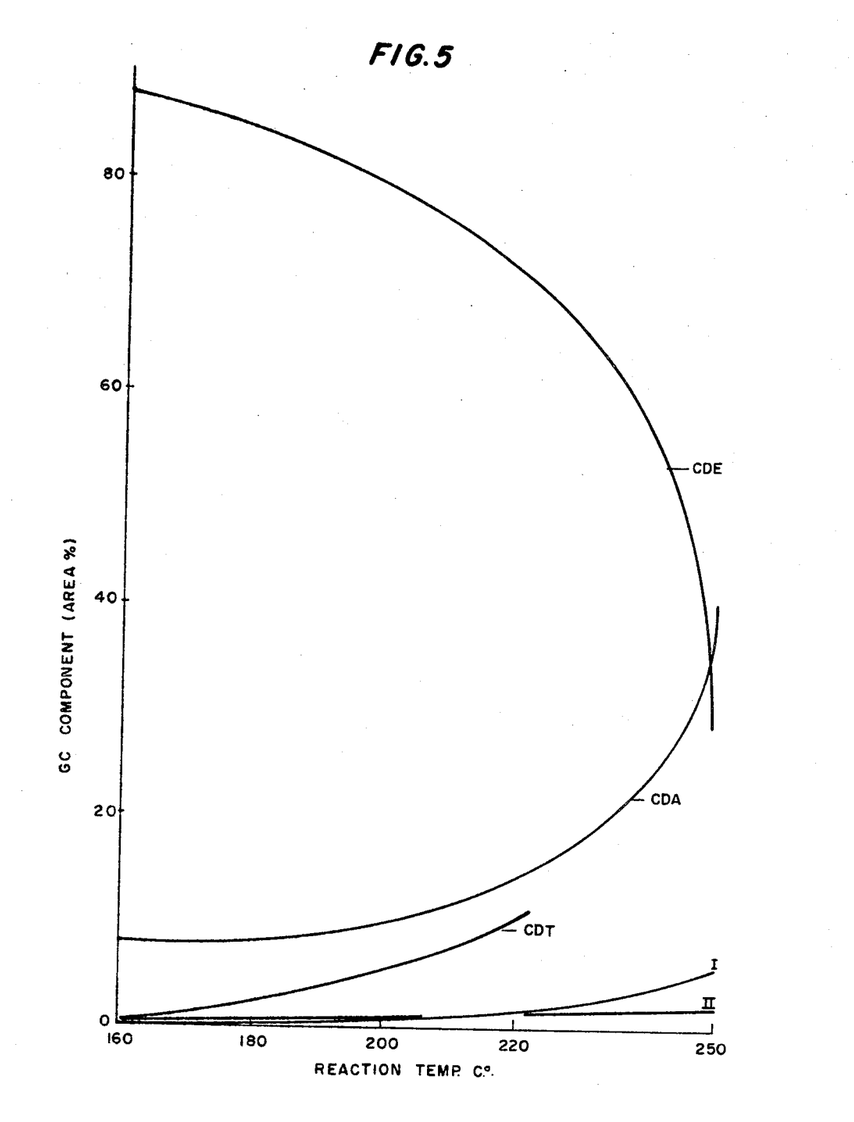

The reactions which give FIG. 5 were conducted utilizing 1.5% of the catalyst described for the other figures and utilizing the pressures staging from higher pressure initially to a lower pressure near a termination of the reaction. The curves were derived from the analyses at the termination of the reaction. The amount of hydrogen adsorbed was that approximately theoretically necessary to convert all of the cyclododecatriene initially present to cyclododecene. The catalyst was recycled from run to run, being fresh at the lower temperature.

Other experiments not plotted show that the reuse of the catalyst at a concentration of 1.5% is perfectly satisfactory. The conclusion drawn from the series of reactions of FIGS. 4 and 5 is that temperature much above 185° C. at the given catalyst concentration are detrimental.

Figure 6:
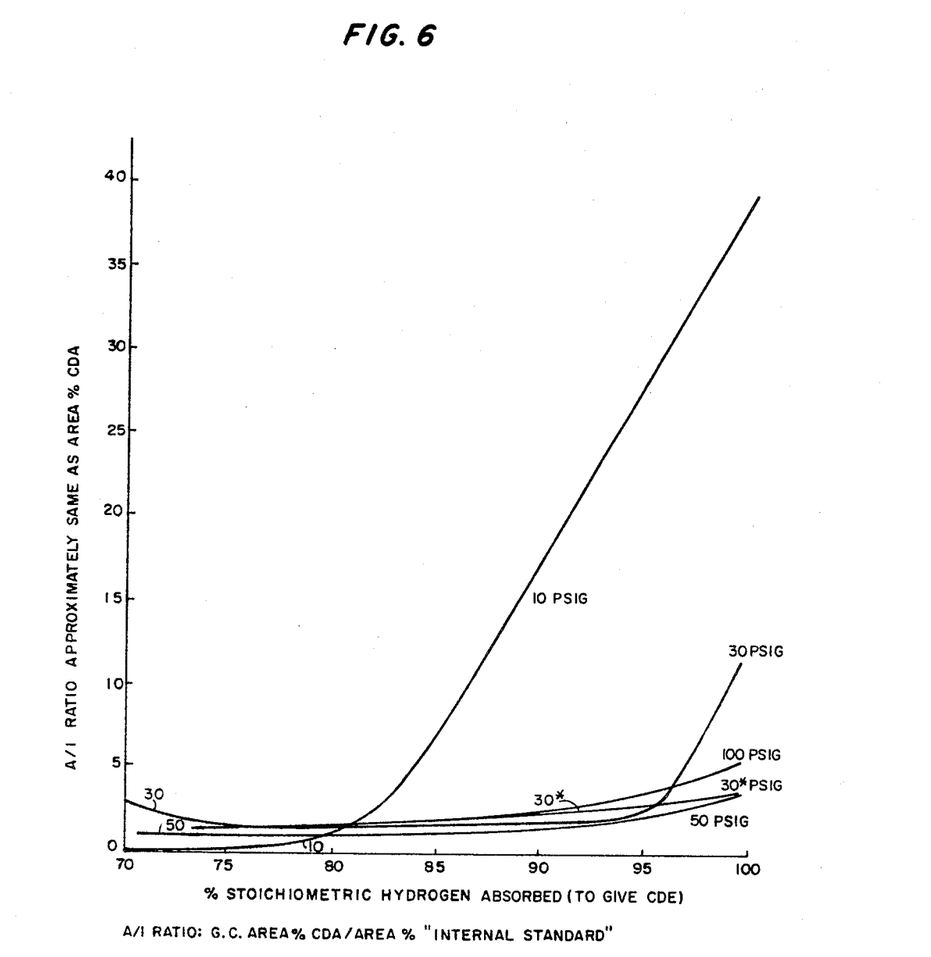

FIG. 6 graphs points plotted during reactions conducted at given fixed pressures of hydrogen. The temperature in each case was 160° C. and the above described palladium on carbon catalyst was used in the amount of 1.4% by weight of the cyclododecatriene. While the sampling technique utilized is considered to have distorted the results somewhat in the direction of diminishing the effect demonstrated, the figure illustrates that the variables depend upon one another in such a way that at the given concentration of catalyst and at this temperature, low pressures favor the formation of cyclododecane (and concomitant formation of aromatic byproducts, not plotted here but shown in FIG. 7). In all of the reactions except that designated by an asterisk (*), after the reactor was filled the reactor space was flushed with argon, which was then vented to a pressure of 1 atmosphere at reaction temperature, resulting in some argon being present and thus reducing the partial pressure of the hydrogen a corresponding amount. In the run designated by an asterisk, the hydrogen was introduced into the reactor space above the liquid, the reactor was charged and sealed and the reactor and charges were then degassed by alternately pumping and stirring at 25–30° C. until, on further stirring, the autoclave pressure did not rise above a 30 inch (gauge) vacuum. Hydrogen was then introduced and the reaction carried forward. As to FIG. 6, the 10 p.s.i.g. curve more nearly approaches the others as the agitation efficiency is increased.

Figure 7:
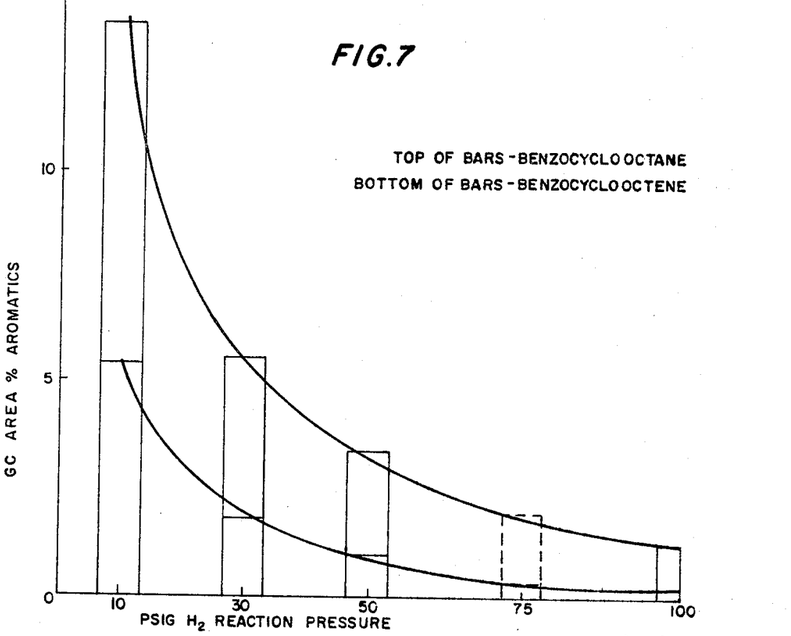

FIG. 7 is based on the same series of reactions as is FIG. 6 and it is considered that the sampling technique was such as to distort the graph somewhat in the direction of enhancing the effect shown.

Figure 8:
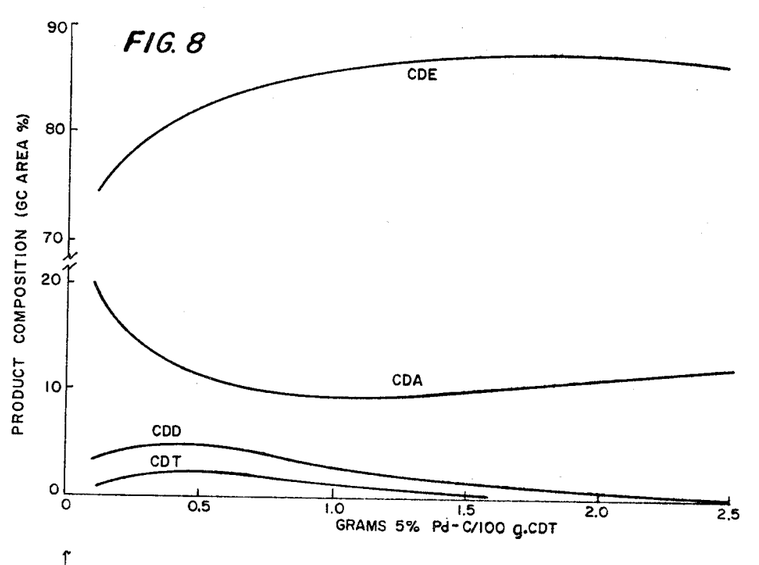

FIGURE 8 illustrates points plotted at the termination of each of a number of reactions with the same pressure conditions being used for each reaction and the temperature being at 160° C. In connection with this figure as well as other figures, it is to be realized that all of the products are not necessarily shown.

Figure 9:
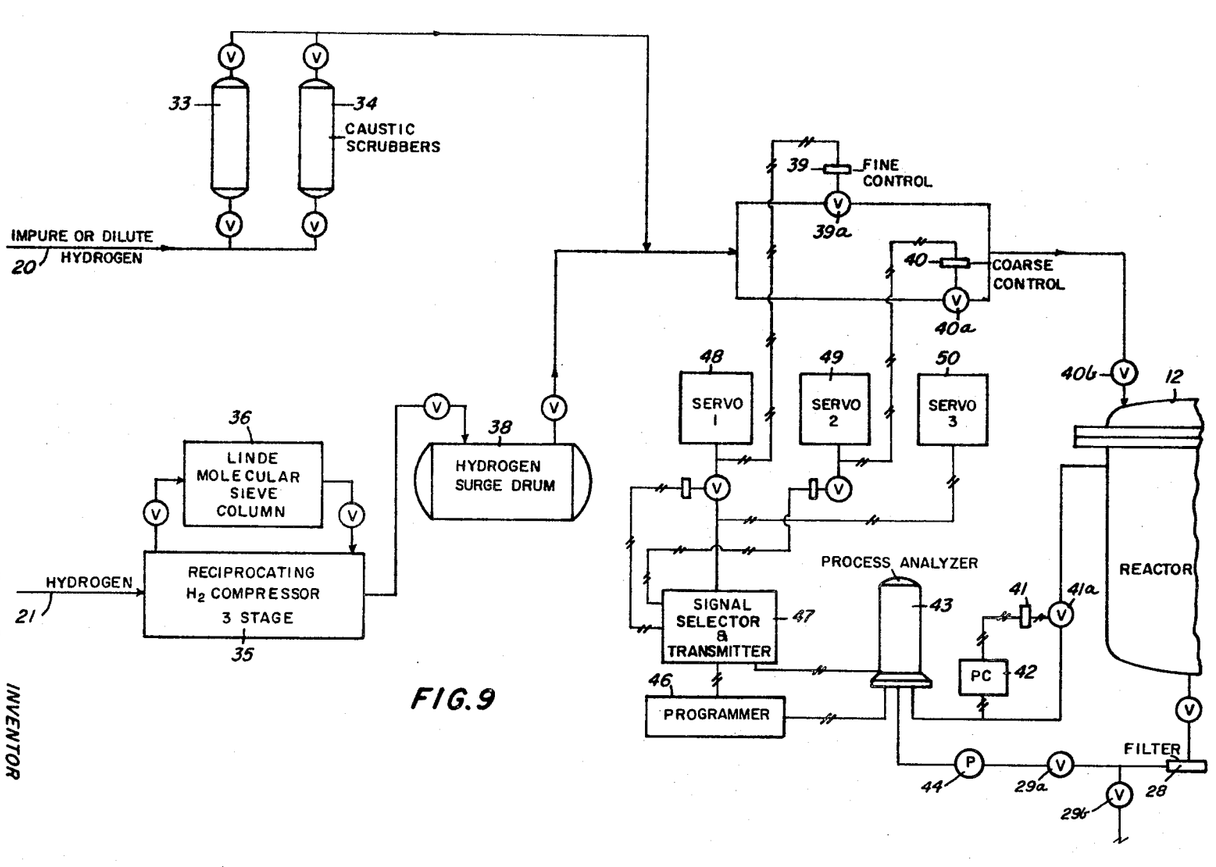
FIGS. 9, 10 and 11 show a suitable arrangement of apparatus for practicing the invention.
Figure 10:
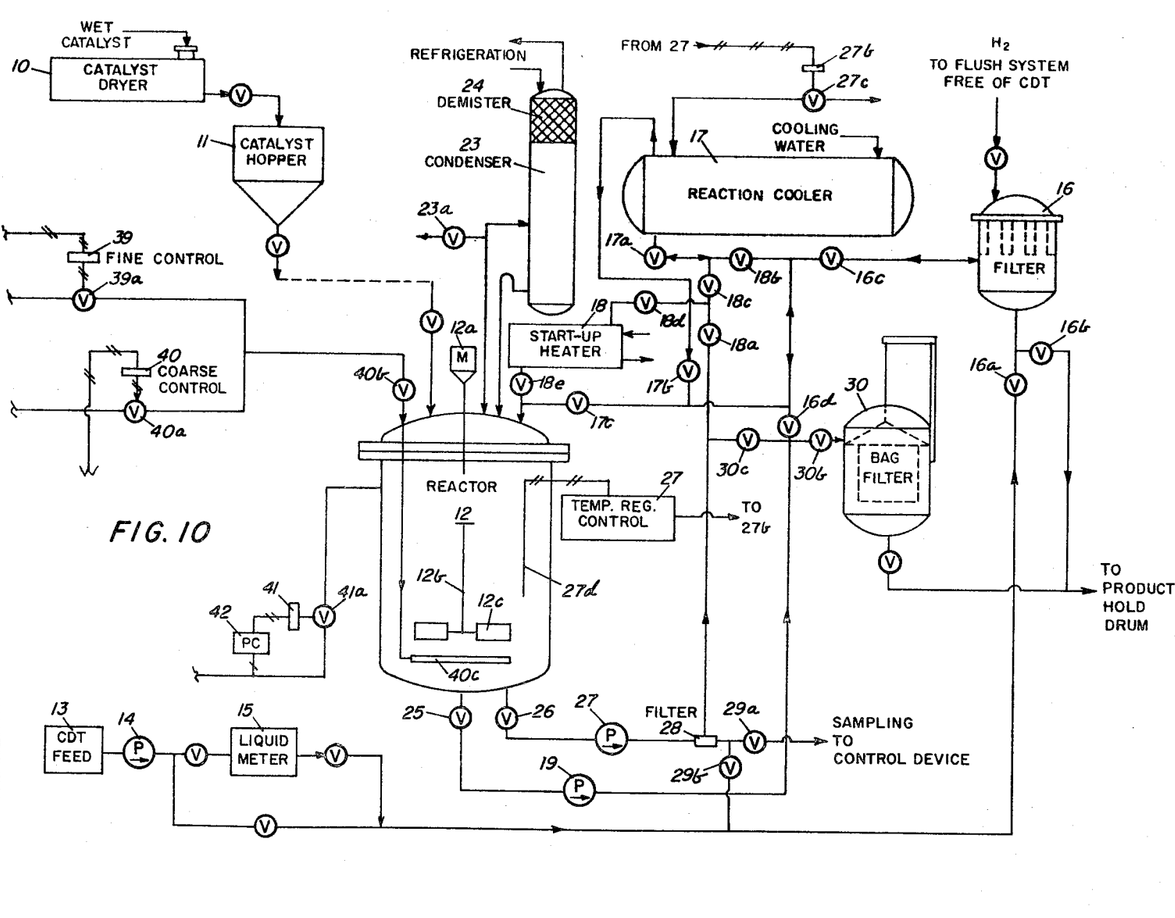
Figure 11:
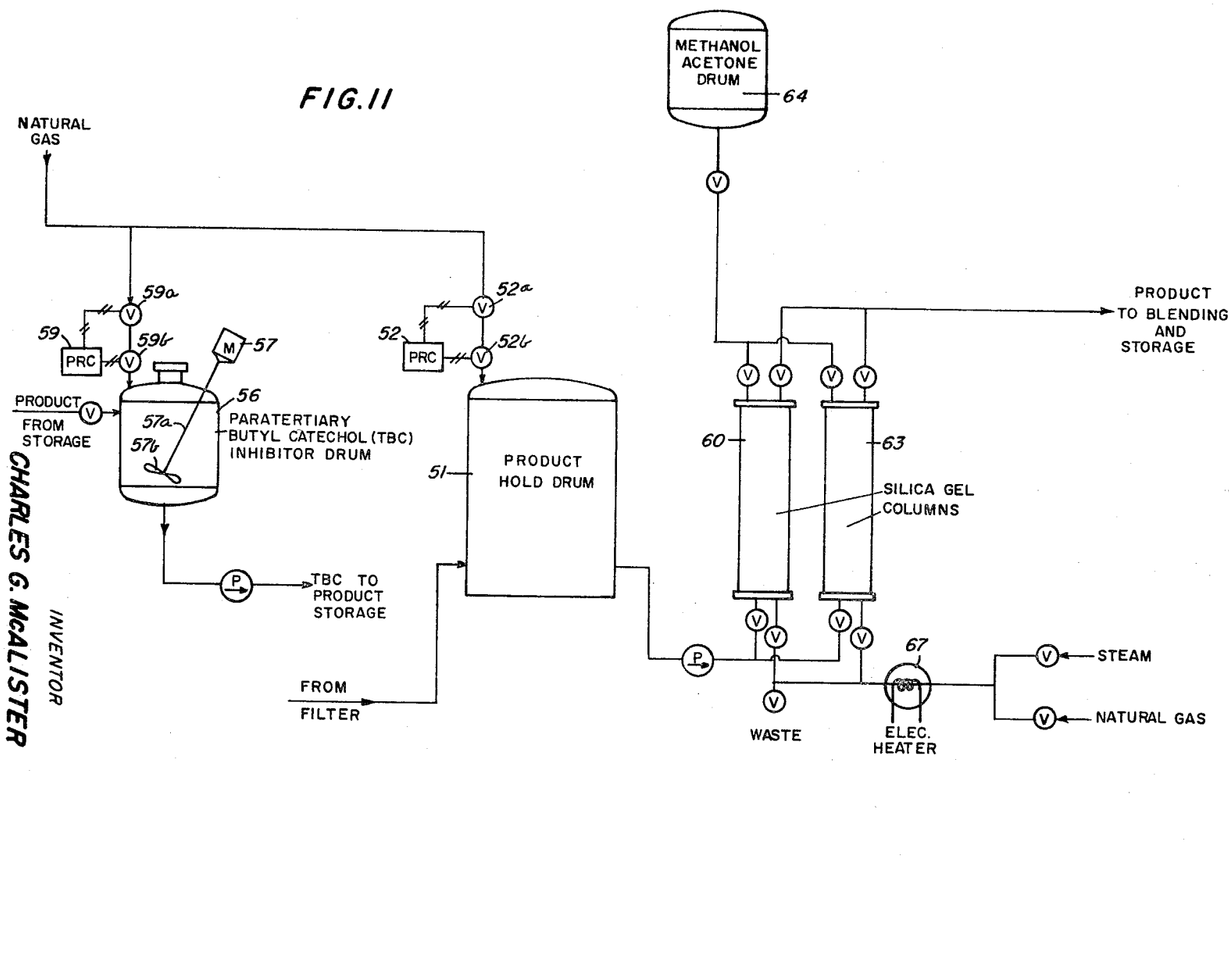

FIGS. 9, 10 and 11 illustrate schematically suitable apparatus and the method for carrying out the hydrogenation of cyclododecatriene, also useful for hydrogenating other materials, for example 1,5-cyclooctadiene. The same apparatus and similar procedures are useful for the other cyclic starting materials used according to the present invention.

The practice of the invention may be carried out with the apparatus and procedure shown in FIGS. 9, 10 and 11 and will be described in detail. Where impure or dilute hydrogen is introduced to a line 20 it is passed through caustic scrubbers 33, 34 containing, for example, solid sodium hydroxide deposited on asbestos. This removes sulfur compounds. In the event it is desired to remove carbon dioxide and/or water, the impure hydrogen is also passed through a molecular sieve such as a "Linde" molecular sieve. In the event the hydrogen is relatively pure it is introduced through a line 21 preferably to a compressor 35, and also if necessary through a molecular sieve 36 to remove impurities such as moisture. A hydrogen surge drum 38 is conveniently used.

In order to control the feeding of hydrogen and to achieve the stepwise reduction in hydrogen pressure, the apparatus schematically illustrated in FIG. 9 is of value.

The reactor and apparatus illustrated in FIG. 10, continued from FIG. 9 and continued on FIG. 11, is designed for a batch operation. The starting material to be hydrogenated is introduced from a suitable source 13 by means of a pump 14 and if desired by way of a liquid meter 15. Assuming a previous batch reaction has taken place, the used catalyst has been collected in filter 16, the material being introduced to the reactor passes a valve 16a in a reverse direction through a filter 16, through valves 16c, 18b, 18c, and 18d into reactor 12 via start-up heater 18 and valve 18e. Optionally, during this charging, the start-up heater may be by-passed through the jumper line connecting valves 16c, 16d, and 17c. Once the desired charge of the starting material to be hydrogenated is introduced into the reactor 12, it is circulated through the start-up heater 18 via valve 26, pump 22, and other suitable valving means 18a and 18d and into the top of the reactor through valve 18e. Optionally, the reactor charge may be heated within the reactor itself, as by an internal stream coil or external heating jacket (stream, electrical coil or strip-heaters, etc.).

Introduction of hydrogen is not commenced until the reactor has been evacuated of air or well purged by an inert gas. Prior to, during, or subsequent to preheating the starting material, a catalyst, is introduced. It may be suitably dried in dryer 10 and kept in hopper 11. Optionally, it may be charged wet and dried in situ during heat-up, the water and possibly a purge gas being vented through valve 23a upstream of condenser 23. The reactor contents are then vigorously agitated by an impeller or turbine 12c driven by a motor 12a and a shaft 12b. Once reaction temperature is reached, the introduction of hydrogen is commenced through a dip-tube or sparger 40c into the liquid phase. Optionally, part or all of the hydrogen may be introduced into the vapor phase above the liquid phase and circulated through said liquid phase by means of a hollow agitator shaft having openings in both the liquid and vapor phases. A part of the hydrogen charge may be introduced while the starting material is being heated to reaction temperatures to speed attainment of preferred operating conditions. Since the reaction is exothermic, once it is commenced, the reaction mixture, including catalyst in suspension is circulated by pump 22 through reaction cooler 17 and back into the reactor via valves 17b and 17c. It is to be noted that if properly sized, pump 19 can, in the event 22 fails, replace the latter in the circulating service described via valve 30c and its connecting lines shown in FIGURE 10.

Certain options or alternatives are possible within the heating-cooling system which can greatly simplify the flow diagram, FIGURE 10, and thus also process operations. First, there is the possibility of using a single external heat-exchanger for both the start-up heater 18 and the reaction cooler 17. Second, internal coils within the reactor may be used in place of or in addition to either or both the external start-up heater and the external reaction cooler. The internal coil may also be used in conjunction with a reactor jacket and/or electrical coil or strip-heaters on the outside reactor walls to provide both heating and cooling as required.

Hydrogen at the desired pressure is introduced through a valve 40b and a given pressure is maintained in the reactor, suitably being controlled by the pressure maintained on the hydrogen. Periodically, when dilute hydrogen is utilized, diluents in the hydrogen accumulate in the reactor space and are vented to a condenser 23. The condenser is provided with a demister section 24 to prevent entrainment.

Samples to be analyzed for purposes of control are withdrawn through a filter 28 and fed to the control device. The filter is designed to retain the catalyst in the continuously circulating reaction mixture, the withdrawn samples thus being free of catalyst. The jumper-line through valve 29b provides a means for back-washing filter 28 should that be necessary. A conventional temperature regulator control device 27 having a temperature sensing element 27a inside the reactor controls the flow of cooling water through the reaction cooler 17 by means of a valve mechanism 27b and 27c.

At completion of the reaction, the reaction mixture is pumped by means of pump 19 through valves 16d and 16c to a filter 16 where the catalyst is separated from the reaction mixture. Pump 22 can spare pump 19 in this service via valves 18a, 18c, 18b, and 16c in an emergency. The reaction mixture, free of catalyst, then flows to storage by means of another valve 16b.

A new charge of the compound having a cycloolefinic nucleus is fed into the reactor by means of valve 16a, thus cleaning the filter and returning the catalyst to the reactor through the start-up heater via valves 16c, 18b, 18c, 18d, and 18e or directly to the reactor via valves 16c and 17c. When the desired amount of charge material such as cyclododecatriene is introduced into the reactor, the necessary valves are manipulated so that hydrogen (or inert gas) pressure on filter 16 flushes held-up hydrocarbon back into the charge line ahead of valve 16a and/or into the recycle system via valve 29b and filter 28 (which is so back-washed between cycles) or via valves 16c and 17c to the reactor. The filters, external start-up heater, external reaction cooler, and manifolding is, of course, positioned to make maximum use of gravity drainage of hydrocarbon hold-up. Forced drainage of the reaction cooler and start-up heater can be provided for by an inert gas or hydrogen pressure above the cooler hold-up introduced via valves 16c and 17b, the hold-up then being forced into the reactor via valves 17a, 18c, 18d, and 18e.

When the activity of the catalyst has been reduced to a point where it is no longer economical to continue use, the hydrogenated reaction mixture is discharged by way of pump 19 through valve 30b (or, in an emergency, pump 22 through valves 30c and 30b) to a separate filter 30 wherein the catalyst is recovered for regeneration or for recovery of the palladium therein. From the filter, the hydrogenated compound such as cyclododecene passes to a holding drum (FIG. 11) 51 from whence it is passed to purification means, such as silica gel columns 60, 63, where impurities which discolor the product are removed. From the silica gel column the product is taken to blending apparatus and to storage. Natural gas may be used to flush the system when it is necessary to do so. Thus by means of a suitable flow control mechanism 52, 52a, 52b natural gas is introduced into the holding drum 51 to remove the residual liquid therefrom. Similarly, natural gas is used to flush an oxidation inhibitor from a means 56 for diluting such oxidation inhibitor with the cyclic compound with which it is to be blended. In the drawing, the inhibitor is shown as p-tertiary butyl catechol (TBC), and it is introduced into the product by way of a suitable control means 59, 59a, 59b. The diluted inhibitor is blended with the product such as cyclododecene and the mixture sent to suitable storage means.

When it is necessary to regenerate or revivify the silica gel columns 60, 63 they are simply flushed with a mixture of methanol and acetone from a drum 64. The column is then heated with steam to drive off solvent.

Example 1

The following runs show the hydrogenation of 1,5,9-cyclododecatriene to obtain cyclododecene. The catalyst concentration was 1.4% by weight of palladium on carbon, containing 5% palladium, the concentration of catalyst being based upon the weight of cyclododecatriene. The temperature was 160° C. and intense agitation was utilized. 100 mole percent of hydrogen, of that theoretically necessary to convert cyclododecatriene to cyclododecene, was absorbed. The first .75 part of hydrogen was introduced at a pressure of 30 p.s.i.g., the second .2 part of hydrogen was introduced at 10 p.s.i.g. and the final .05 part hydrogen was introduced at a pressure of 5 p.s.i.g. The results are as follows, the symbols having the meaning given above. The importance of adequate agitation is also illustrated. The "turbine" was a standard, 6 bladed, flat blade turbine, 0.4 the inside diameter of the autoclave. The "Dispersimax" used was the same as the turbine, but with a hollow shaft with an opening above the liquid level for withdrawing hydrogen, which was introduced into the reaction mixture in the turbine hub.

It is preferred to introduce the hydrogen directly into the liquid, rather than into the gas space. The dipleg was a conduit which fed the hydrogen below the liquid level. The sparger operates similarly, but introduced the hydrogen as small bubbles.

| Run No. 1 | a | b | c | d | e | f | g | h | i | j |
|---|---|---|---|---|---|---|---|---|---|---|
| Conditions: | | | | | | | | | | |
| Agitation Type | Turbine | Turbine | Turbine | Turbine | Turbine | Turbine | Turbine | "Dispersimax" | Turbine | Turbine |
| Agitator, r.p.m | 840 | 860 | 1,150 | 1,500 | 1,750 | 2,075 | 3,750 | 1,750 | 1,500 | 1,750 |
| H₂ Inlet | Dipleg | Dipleg | Dipleg | Dipleg | Dipleg | Dipleg | Dipleg | Dipleg | Sparger | Sparger |
| Reaction Time, Min.: | | | | | | | | | | |
| 1st 75%, 30 p.s.i.g | 290 | 209 | 67 | 31 | 20 | 13 | 5 | 13 | 31 | 20 |
| 2nd 20%, 10 p.s.i.g | 249 | 156 | 53 | 22 | 15 | 9 | 3 | 9 | 22 | 12 |
| Last 5%, 5 p.s.i.g | 79 | 68 | 31 | 11 | 7 | 3 | 2 | 5 | 9 | 5 |
| Total Time | 618 | 433 | 151 | 64 | 42 | 25 | 10 | 27 | 62 | 37 |
| Product Analysis: | | | | | | | | | | |
| G.C., Area percent: | | | | | | | | | | |
| CDA | 37.8 | 28.2 | 3.3 | 3.8 | 2.2 | 4.3 | 6.0 | 3.0 | 1.1 | 2.7 |
| CDE | 50.9 | 64.6 | 94.0 | 94.6 | 94.5 | 94.3 | 91.3 | 94.4 | 95.7 | 95.3 |
| CDD | | 0.1 | 0.1 | 0.2 | 1.2 | 0.3 | 1.5 | 0.9 | 1.5 | 0.7 |
| CDT | | | | | 0.1 | | | 0.1 | 0.1 | |
| Aromatic 1 | 5.7 | 3.8 | 1.2 | 0.1 | 0.3 | | | 0.1 | 0.5 | 0.2 |
| Aromatic 2 | 3.5 | 2.1 | 0.1 | | | | | | | |
| Others | 2.1 | 1.2 | 1.3 | 1.3 | 1.7 | 1.1 | 1.2 | 1.5 | 1.1 | 1.1 |
| Chemical Unsaturation: | | | | | | | | | | |
| Determined | 0.351 | 0.410 | 0.583 | 0.583 | 0.633 | 0.580 | 0.606 | 0.598 | 0.631 | 0.606 |
| Calculated From G.C. | 0.328 | 0.403 | 0.568 | 0.572 | 0.585 | 0.571 | 0.568 | 0.581 | 0.596 | 0.582 |

Example 2

Using procedures and conditions similar to those of the foregoing example, but using a different cyclododecatriene charge stock prepared by cyclization of butadiene with a combination of bis(triisooctylphosphite) nickel dicarbonyl and triethylaluminum, gave the following results. Temperature was 160° C. and 1.4%, by weight of the charge, of the same catalyst was used. A one gallon autoclave was used.

| Run No. 2 | a | b | c | d |
|---|---|---|---|---|
| No. of Runs on Cat | 1st | 3rd | 5th | 7th |
| Reaction Time, Min | 44 | 45 | 36 | 39 |
| G.C., Area percent: | | | | |
| CDA | 6.5 | 8.4 | 5.4 | 12.8 |
| CDE | 92.2 | 90.6 | 92.7 | 85.9 |
| CDD | 0.4 | | 0.6 | |
| CDT | | | | |
| Arom. I | 0.7 | 0.8 | 0.7 | 0.8 |
| Others | 0.2 | 0.2 | 0.6 | 0.5 |
| Chem. Unsat., moles/100 g | 0.550 | 0.537 | 0.563 | 0.512 |
| Unsat., Calc. from G.C. | 0.559 | 0.545 | 0.565 | 0.517 |
| Difference | +0.009 | +0.008 | +0.002 | +0.005 |

Example 3

In order to ascertain some of the problems involved in the present invention, a reaction was conducted at 200° C. with 100 grams of cyclododecatriene, 1.4 grams of palladium on carbon containing 5% by weight of palladium, with samples being taken periodically throughout the reaction. The total amount of hydrogen actually introduced was approximately 5% in excess of the stoichiometric quantity theoretically necessary to obtain cyclododecene, but it is postulated that ring collapse of cyclododecatriene and hydrogen transfer accounted for the overhydrogenation. Nevertheless, the experiment illustrates the many compounds and isomers which appear during the course of the reaction.

| Sample Component [1] | K | A | B | C | D | E | F | G | H | I | J |
|---|---|---|---|---|---|---|---|---|---|---|---|
| Pre-CDA [2] | .5 | .8 | .8 | 1.3 | 1.4 | 1.2 | 1.4 | 1.5 | 1.7 | 1.6 | 2.7 |
| CDA | | 2.5 | .6 | .3 | .3 | .6 | .8 | 3.6 | 22.8 | 42.9 | 63.7 |
| t-CDE | | 2.2 | 5.7 | 12.2 | 20.1 | 28.1 | 43.7 | 51.8 | 41.7 | 28.0 | 11.8 |
| Unk | | .5 | | | | | | | | | |
| tt-CDD | | 7.8 | 15.4 | 26.0 | 23.6 | 17.4 | 12.0 | 1.0 | | | |
| c-CDE | | | | | | 12.8 | 15.8 | 25.7 | 19.1 | 12.8 | 6.3 |
| ttt-CDT | 90.1 | 71.5 | 60.6 | 32.5 | 24.8 | 12.5 | 3.5 | | | | |
| tc-CDD | | 1.1 | 4.4 | 10.4 | 12.5 | 12.2 | 7.4 | 1.9 | .2 | .2 | |
| Unk | .1 | .4 | | | | | | | | | |
| Unk | 1.0 | 3.4 | 3.3 | 3.9 | 3.6 | 1.8 | 1.1 | 1.2 | | | |
| Unk | | | | | 1.7 | 1.9 | .2 | .2 | | | |
| ttc-CDT | 7.3 | 5.6 | 4.1 | 3.2 | 1.8 | 1.8 | 1.8 | 1.0 | .2 | | |
| Unk | | | | .9 | | | | | | | |
| Unk | .1 | | | .5 | | | | | | | |
| Unk | | | | .4 | | | | | | | |
| Unk | .8 | | | .2 | | | | | | | |
| I | | 1.5 | 3.2 | 5.9 | 7.0 | 7.4 | 9.3 | 9.4 | 9.2 | 8.9 | 9.6 |
| Unk | | .4 | | .3 | .3 | | | | | | |
| Unk | | .3 | .3 | .2 | | | | | | | |
| II | | 1.7 | 1.0 | 1.6 | 2.2 | 2.5 | 3.7 | 4.4 | 4.9 | 5.3 | 6.0 |
| Totals | 99.9 | 99.0 | 99.8 | 99.9 | 99.5 | 99.2 | 99.9 | 99.7 | 99.6 | 99.7 | 100.1 |

[1] G.C., area percent.
[2] Unidentified compounds having chromatographic elution time less than CDA. Low boiling impurities.

Example 4

Variations in agitation and in the manner of feeding hydrogen lead to widely varying results, as is shown by Example 1. While it was found that the agitation used in the following examples was poor, it was consistent and the examples are suitable for showing variations of hydrogen pressure. The examples were run as indicated in the following table with the given results.

| Run 4 | a | b | c | d | e | f | g |
|---|---|---|---|---|---|---|---|
| Catalyst [1] (g./100 g. CDT) | 1.4 | 1.4 | 1.4 | 1.4 | 1.4 | 1.4 | 1.4 |
| Temperature, ° C | 160 | 160 | 160 | 160 | 160 | 160 | 160 |
| Technique [2] | Argon flush | | | Evacuation | | | |
| P.s.i.g./lbs./mins.[3] | 30/238/67 | 50/238/65 | 100/238/22 | 30/185/55 10/239/114 | 50/226/34 10/238/46 | 50/240/39 | 100/240/15 |
| Product Data (GLPC):[4] | | | | | | | |
| Pre-CDA | 1.4 | 1.5 | 1.7 | 0.7 | 1.8 | 1.5 | 1.6 |
| CDA | 2.4 | 3.5 | 6.2 | 4.9 | 4.9 | 6.9 | 8.9 |
| CDE | 85.7 | 84.7 | 83.0 | 87.8 | 85.9 | 82.6 | 78.8 |
| CDD | 7.2 | 7.0 | 8.0 | 5.8 | 6.4 | 8.1 | 8.4 |
| CDT | 1.5 | 1.3 | .9 | .6 | .7 | .9 | 2.2 |
| I [5] | 1.5 | 1.3 | .2 | .2 | .4 | | .2 |
| II | .4 | .7 | | | | | |
| Totals | 100.1 | 100.0 | 100.0 | 100.0 | 100.1 | 100.0 | 100.1 |

[1] 5% Pd/C.
[2] Argon flush—pressures shown are p.s.i.g. H₂, above atm. of argon plus hydrocarbon vapor at 160° C.
Evacuation—pressures shown are p.s.i.g. H₂ above approximately hydrocarbon vapor at 160° C.
[3] Total reactor pressure/cumulative reservoir pressure drop/cumulative time.
[4] Normalized area percents.
[5] "Aromatic" by-products I and II.

Example 5

This example was conducted similarly to the foregoing example and illustrates that utilizing high purity cyclododecatriene (over 99% pure), initial pressures of 50 p.s.i.g. and 100 p.s.i.g. give excellent results. The catalyst was the same as in the foregoing examples.

| Run 5 | a | b | c | d |
|---|---|---|---|---|
| Conditions: | | | | |
| Temperature (° C.) | 160 | 160 | 160 | 160 |
| Catalyst Wt. (g.) [1] | 1.4 | 1.4 | 1.4 | 1.4 |
| P.s.i.g./lbs./mins.[2] | 30/188/60 10/226/107 5/237/133 | 50/188/31 10/226/78 5/237/100 | 100/188/12 10/226/61 5/237/87 | 30/188/45 10/226/82 5/237/102 |
| G.C., Area percent: | | | | |
| Pre-CDA | 1.2 | 1.2 | 1.4 | 1.4 |
| CDA | 4.5 | 5.3 | 4.4 | 5.7 |
| CDE | 91.6 | 90.2 | 92.5 | 92.1 |
| CDD | 2.6 | 2.8 | 1.6 | .1 |
| CDT | .1 | .2 | .1 | .2 |
| I [3] | tr | .3 | tr | .6 |
| II | | | | |
| Chem. Unsat.[4] | 0.615 | 0.615 | 0.613 | |

[1] Fresh catalyst/100 g. CDT charged.
[2] Total reactor pressure/reservoir pressure drop/cumulative time.
[3] "Aromatics" I and II by-products.
[4] Chemical unsaturation by ICl method, moles/100 g. Sx.

Example 6

Using similar procedures to the foregoing and the same catalyst, but using a feed stock or starting material prepared by cyclizing butadiene to obtain cyclododecatriene in the presence of a catalyst containing for example chromium acetylacetonate and triethyl aluminum, and in which the CDT was of about 99% purity, purified by distillation. This procedure gave the results indicated. The catalyst was re-used from run to run.

These runs illustrate that with this type of starting material the present invention gives excellent results, but that later runs re-using the same catalyst gave poorer results, at the catalyst concentration used (1.6%), and at temperatures much above 160° C.

| Run 6 | a | b | c | d | e | f | g |
|---|---|---|---|---|---|---|---|
| Hydrogen (p.s.i.g./lbs./mins.)[1] | 30/202/47 | 30/203/42 | 30/203/38 | 30/202/36 | 30/202/33 | 30/200/33 | 30/202/41 |
| | 10/241/98 | 10/241/88 | 10/241/102 | 10/240/54 | 10/240/49 | 10/240/54 | 10/242/62 |
| | 5/256/135 | 5/255/130 | 5/255/168 | 5/255/65 | 5/253/58 | 5/251/65 | 5/255/72 |
| Temperature (° C.) | 160 | 180 | 200 | 170 | 180 | 190 | 160 |
| G.C., Area percent: | | | | | | | |
| Pre-CDA | 0.2 | 0.2 | | | | | |
| CDA | 4.0 | 7.0 | 18.5 | 8.7 | 8.4 | 8.8 | 8.6 |
| CDE | 89.8 | 91.6 | 75.8 | 81.4 | 80.6 | 80.9 | 80.5 |
| CDD | 5.2 | 0.2 | 0.3 | 8.5 | 9.3 | 8.7 | 9.8 |
| CDT | 0.7 | | 0.3 | 1.3 | 1.2 | 1.4 | 1.1 |
| I[2] | 0.2 | 1.1 | 3.3 | 0.2 | 0.5 | 0.2 | 0.1 |
| II | | | 1.7 | | | | |
| Total | 100.1 | 100.1 | 99.9 | 100.1 | 100.0 | 100.0 | 100.1 |
| Chem. Unsat., Determined[3] | 0.607 | 0.558 | 0.480 | 0.585 | 0.594 | 0.601 | 0.594 |
| Calculated from G.C. | 0.618 | 0.553 | 0.477 | 0.616 | 0.621 | 0.618 | 0.624 |

[1] Total reactor pressure/cumulative reservoir pressure drop/cumulative time; times measured from point at which reaction temperature reached.
[2] "Aromatic" by-products I and II.
[3] ICl method.

Example 7

Hydrogenation of cyclododecatriene using widely varying catalyst concentrations (carbon with 5% Pd) is illustrated by the following data. Temperature was 160° C., and the procedure was similar to Example 4, as were conditions not stated. The fourth and fifth runs were on cyclododecatriene which has been passed through a column of silica gel as one of the purification steps. The unsaturation was determined by titration with iodine monochloride.

| Run 7 | a | b | c | d | e | f |
|---|---|---|---|---|---|---|
| Catalyst (g./100 g.) | 0.1 | 0.2 | 0.5 | 1.4 | 1.4 | 2.5 |
| Run Temp., ° C. | 160 | 160 | 160 | 160 | 160 | 160 |
| H₂ In (lbs. reservoir) | 250 | 250 | 250 | 250 | 250 | 250 |
| Unsaturation (moles/100 g.) | 0.54 | 0.53 | 0.60 | 0.56 | 0.57 | 0.52 |
| Calculated Unsaturation, G.C. | 0.50 | 0.54 | 0.58 | 0.54 | 0.54 | 0.52 |
| Component, G.C., Area percent: | | | | | | |
| CDA | 20.1 | 15.8 | 9.9 | 9.5 | 9.5 | 11.9 |
| CDE | 74.6 | 76.6 | 82.7 | 86.3 | 85.7 | 86.0 |
| CDD | 3.0 | 4.3 | 4.5 | 1.0 | 1.5 | .1 |
| CDT | .5 | 1.6 | 1.6 | .3 | .5 | .2 |
| I | | | | | .3 | .2 | .3 |
| II | | | | | | .1 |

Example 8

Maintenance of the pressure at a level such that the partial pressure of hydrogen was consistent over a range of temperatures was used to compensate for increased hydrocarbon partial vapor pressure at higher temperatures in this example, for closer control of conditions and comparison of results. A 300 milliliter autoclave was flushed with argon, and heating was started under an atmosphere of that gas. At reaction temperature the argon was vented to a reactor pressure of 1 atmosphere. Hydrogen was then introduced to the desired guage reading and hydrogen feed pressures were manipulated in the same way and to the same total hydrogen uptake from run to run in each of the series of experiments. The catalyst concentration was 1.4 grams of catalyst per 100 grams of cyclododecatriene, the catalyst containing 5% by weight of palladium on carbon. The results show that selectivity for cyclododecene drops sharply at high temperatures using the given catalyst concentration. As has been indicated elsewhere herein, high temperatures are useful at higher pressures and lower catalyst concentrations.

| Run 8 | a | b | c | d | e |
|---|---|---|---|---|---|
| Reaction Temp., ° C. | 80 | 120 | 160 | 180 | 200 |
| P.s.i.g./lbs./mins.[1] | 30/192/129 | 30/185/119 | 30/185/83 | 30/185/89 | 30/185/173 |
| | 10/232/195 | 10/231/199 | 10/231/169 | 10/231/223 | 10/193/240 |
| | 5/238/208 | 5/238/216 | 5/235/199 | 2/237/277 | |
| Ref. Index | 1.4850 | 1.4854 | 1.4851 | 1.4857 | 1.4937 |
| G.C., Area percent: | | | | | |
| Pre-CDA | 1.4 | 1.7 | 1.5 | 1.4 | 1.5 |
| CDA | 14.5 | 9.2 | 5.3 | 17.9 | 47.3 |
| CDE | 67.4 | 75.8 | 90.6 | 75.9 | 28.2 |
| CDD | 14.8 | 10.8 | 2.2 | .2 | 1.0 |
| CDT | 2.0 | 2.3 | .1 | | 1.9 |
| I[2] | | | .3 | 3.2 | 12.3 |
| II | | | | 1.5 | 7.8 |
| Unsats. Calculated | .624 | .631 | .576 | .468 | .266 |
| Unsat. Found[3] | 0.619 | 0.625 | 0.584 | 0.466 | 0.277 |

[1] Total reactor pressure/cumulative reservoir pressure drop/cumulative time; times measured from point at which reaction temperature reached.
[2] "Aromatic" by-products I and II.
[3] ICl method.

Example 9

Under similar conditions but using a lower catalyst concentration of 0.2 gram of palladium on carbon, containing 5% palladium, per 100 grams of cyclododecatriene charge material, the following shows that higher temperatures are useful with lower catalyst concentration. The data of this example is as follows:

| Run 9 | a | b | c | d | e |
|---|---|---|---|---|---|
| Reaction Temp. | 80 | 120 | 160 | 180 | 20 |
| P.s.i.g./lbs./mins.[1] | 30/185/285 | 30/180/124 | 30/185/198 | 30/185/147 | 30/185/20 |
| | 10/238/491 | 10/238/284 | 10/238/388 | 10/241/313 | 10/238/49 |
| Ref. Index | 1.4852 | 1.4855 | 1.4855 | 1.4863 | 1.4867 |
| G.C., Area percent: | | | | | |
| Pre-CDA | 1.4 | 1.6 | 1.3 | 1.4 | 1.3 |
| CDA | 18.4 | 12.2 | 8.7 | 5.6 | 37.9 |
| CDE | 57.7 | 67.5 | 78.7 | 83.7 | 48.8 |
| CDD | 19.8 | 16.4 | 10.6 | 8.5 | .5 |
| CDT | 2.7 | 2.3 | .6 | .4 | 2.0 |
| I[2] | | tr | | .6 | 5.9 |
| II | | | | tr | 3.7 |
| Unsats. calculated | .639 | .649 | .614 | .615 | .360 |
| Unsat. Found[3] | 0.608 | 0.632 | 0.616 | 0.624 | 0.372 |

[1] Total reactor pressure/cumulative reservoir pressure drop/cumulative time; time measured from point at which reaction temperature reached.
[2] "Aromatic" by-products I and II.
[3] ICl method.

Example 10

Further showing the effects of catalyst concentration at high temperatures is the following series of runs all conducted at 200° C., the catalyst being one which contained 5% palladium on carbon.

| Run 10 | a | b | c | d | e | f |
|---|---|---|---|---|---|---|
| Catalyst Conc. | 0.1 | 0.2 | 0.2 dry | 0.5 | 1.4 | 2.5 |
| P.s.i.g./lbs./mins.[1] | 30/185/65 | 30/185/27 | 30/185/25 | 30/185/22 | 30/185/20 | 30/185/20 |
|  | 20/245/65 | 20/245/47 | 20/245/42 | 20/245/38 | 20/245/31 | 10/245/71 |
| Ref. Index | 1.4845 | 1.4853 | 1.4848 | 1.4851 | 1.4853 | 1.4867 |
| G.C., Area percent: |  |  |  |  |  |  |
| Pre-CDA | 1.7 | 1.5 | 1.6 | 2.2 | 1.4 | 1.7 |
| CDA | 12.3 | 9.0 | 10.8 | 11.1 | 22.3 | 29.5 |
| CDE | 81.3 | 83.1 | 82.6 | 83.3 | 71.3 | 59.6 |
| CDD | 4.4 | 5.5 | 4.3 | 2.0 |  | .1 |
| CDT | .2 | .4 | .3 | .2 |  |  |
| I[2] | .1 | .4 | .4 | 1.0 | 3.6 | 6.1 |
| II |  |  |  | .2 | 1.5 | 3.1 |
| Unsats. calculated | .547 | .574 | .555 | .530 | .438 |  |
| Unsat. Found [3] | 0.552 | 0.591 | 0.575 | 0.554 | 0.445 | 0.402 |

[1] Total reactor pressure/cumulative reservoir pressure drop/cumulative time; times measured from point at which reaction temperature reached.
[2] "Aromatic" by-products I and II.
[3] ICl method.

Example 11

The following examples were conducted similarly to those given above, 100 grams of cyclododecatriene being used and the catalyst being 1.4 grams of 5% palladium on carbon, but differing in that the feed stock had differing ratios of the trans,trans,cis-isomer of cyclododecatriene to the trans,trans,trans-isomer (ttc/ttt). This example shows that the conditions useful for one are equally applicable to the other. The ratio of trans-cyclododecene to cis-cyclododecene in the product from either starting material is about the same.

| Run 11 | a | b | c | d |
|---|---|---|---|---|
| Predominant isomer | t,t,c | t,t,c | t,t,t | t,t,t |
| Reaction Temp | 160 | 200 | 200 | 160 |
| Catalyst Conc | 1.4 | 0.2 | 0.2 | 1.4 |
| P.s.i.g./lbs./mins.[1] | 30/185/108 | 30/185/17 | 30/185/31 | 30/185/83 |
|  | 10/240/230 | 10/250/69 | 10/233/85 | 10/231/169 |
|  |  |  | 5/245/150 | 5/235/199 |
| Ref. Index | 1.4853 | 1.4853 | 1.4855 | 1.4851 |
| G.C., Area Percent: |  |  |  |  |
| Pre-CDA | 1.0 | .1 | 1.5 | 1.6 |
| CDA | 6.7 | 7.2 | 6.6 | 5.0 |
| CDE | 90.2 | 90.8 | 89.5 | 91.8 |
| CDD | .1 | 1.3 | 1.7 | 1.0 |
| CDT | .1 | .1 | .2 | .2 |
| I[2] | 1.1 | .3 | .4 | .3 |
| II | .8 | .1 | .1 | .1 |
| Unsats. calculated | .550 | .566 | .565 | .570 |
| Unsat. Found [3] | 0.555 | 0.575 | 0.597 | 0.584 |

[1] Total reactor pressure/cumulative reservoir pressure/drop cumulativ time; times measured from point at which reaction temperature reached.
[2] "Aromatic" by-products I and II.
[3] ICl method.

Example 12

Continuing the hydrogenation of the reaction product of Example 5(d), with the same catalyst, the temperature being reduced to 80° C., the pressure being increased to 50 p.s.i.g., an additional 121 pounds of hydrogen being introduced, and the reaction being conducted for an additional 257 minutes, gave the following results.

Analytical data:

G.C., area percent—
- Pre-CDA _______ 1.4
- CDA _______ 97.0
- CDE _______ .6
- CDD _______
- CDT _______
- I _______ .8
- II _______ .2
- Chem. unsat., by ICl method, moles/100 g__ 0.012

I claim:

1. In a process of selectively hydrogenating two of the three double bonds in a substituted or unsubstituted cyclododecatriene-1,5,9 with gaseous hydrogen in the presence of a hydrogenation catalyst to obtain a substituted or unsubstituted cyclododecene, the improvement of maintaining a substantially constant hydrogen pressure of between about 30 p.s.i.g. and about 100 p.s.i.g. during a first portion of the reaction in which about 50% to 90% of that hydrogen necessary on a molar basis to convert said cyclododecatriene to said cyclododecene is reacted, and of maintaining said hydrogen pressure substantially constant during at least one pressure stage below about 30 p.s.i.g. during a last portion of the reaction in which the remaining about 10% to about 50% hydrogen is reacted, whereby undesired byproducts are minimized.

2. The process of claim 1 in which said catalyst includes metallic palladium.

3. The process of claim 2 in which the reaction temperature is between about 140° and about 200° C.

4. The process of claim 3 in which the proportion of catalyst is varied inversely with temperature.

5. The process of claim 4 in which said temperature is between about 140° C. and about 185° C.

6. The process of claim 3 in which said cyclododecatriene is at least one of the cis- and/or trans-isomers of 1,5,9-cyclododecatriene, said catalyst is finely divided metallic palladium deposited upon an activated carbon support, said temperature is maintained between about 140° C. and 185° C., and catalyst concentration is varied inversely with temperature.

7. The process of claim 1 in which successively lower stages of hydrogen pressure of below about 30 p.s.i.g. are applied after said about 50% to about 90% of the stoichiometric amount of hydrogen necessary to obtain the monoolefin has reacted.

References Cited

UNITED STATES PATENTS

| | | | |
|---|---|---|---|
| 2,360,555 | 10/1955 | Evans | 260—666 |
| 3,022,359 | 2/1962 | Wiese | 260—666 |
| 3,108,142 | 10/1963 | Leppe | 260—666 |

FOREIGN PATENTS 932,226  7/1963  Great Britain.

DELBERT E. GANTZ, *Primary Examiner.*

V. O'KEEFE, *Assistant Examiner.*